F. C. HOWE AND R. G. WARNER.
ELECTRIC SYNCHRONIZING DEVICE.
APPLICATION FILED JAN. 29, 1920.

1,371,096.

Patented Mar. 8, 1921.

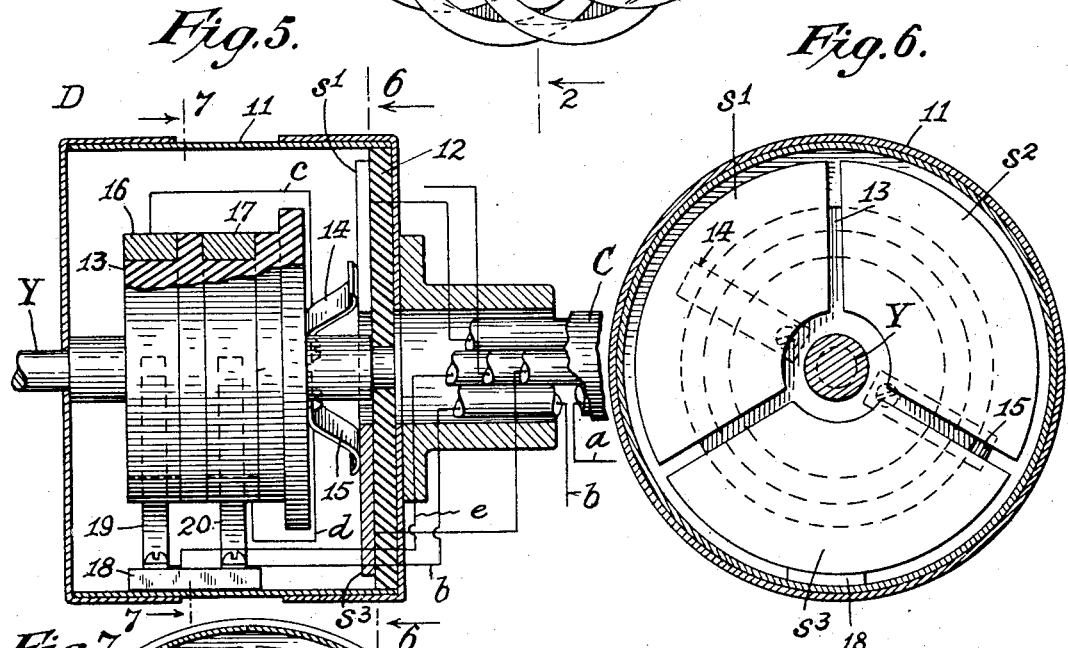

F. C. HOWE AND R. G. WARNER.
ELECTRIC SYNCHRONIZING DEVICE.
APPLICATION FILED JAN. 29, 1920.

1,371,096.

Patented Mar. 8, 1921.

Fred C. Howe
Russell G. Warner
Inventors

By their Attorney

UNITED STATES PATENT OFFICE.

FRED C. HOWE AND RUSSELL G. WARNER, OF NEW HAVEN, CONNECTICUT; SAID WARNER ASSIGNOR TO SAID HOWE.

ELECTRIC SYNCHRONIZING DEVICE.

1,371,096.     Specification of Letters Patent.     Patented Mar. 8, 1921.

Application filed January 29, 1920. Serial No. 354,899.

*To all whom it may concern:*

Be it known that we, FRED C. HOWE and RUSSELL G. WARNER, citizens of the United States, and residents of New Haven, in the county of New Haven and State of Connecticut, have invented certain new and useful Improvements in Electric Synchronizing Devices, of which the following is a specification.

This invention relates generally to means for synchronizing the movements of driving and driven elements under conditions where excessive distance between these elements, or intervening obstacles, or necessarily variable relative directions of movement—such as where the driven element must have bodily movement with respect to the driving element—renders impracticable the ordinary forms of rigid or fixed mechanical power-transmitting means. We have in mind, for example, the well-known automobile speedometer, the location of which with respect to its source of power is necessarily such that rigid shafting, with or without gears, chains and sprockets, and other fixedly-mounted connections are impracticable. In this and many other like situations, it has been the practice to employ a flexible shaft, of common and well-known construction, as the connecting medium, but while the flexible shaft undoubtedly insures a satisfactory degree of accuracy so long as it remains bodily or constructionally intact, the varying torsional strains to which it must be subjected when in use render it comparatively short-lived. Furthermore it will be apparent that the distance through which power may be transmitted by means of a flexible shaft is comparatively narrowly limited.

We are well aware that the idea of electric power transmission which insures a practical degree of synchronism is not new, but so far as we have been able to determine efforts heretofore made to so control electric impulses as to insure even a reasonable degree of accuracy in attempting to drive an independently mounted element at the same or a constantly proportionate rate of speed as that of what may be termed a primary moving element, have resulted in the conception of apparatus and contrivances much too intricate, complicated and cumbersome for either economical manufacture or practical use. Undoubtedly, a series of electric circuits may be progressively made and broken at regular intervals by movement of a mechanically driven element and thereby synchronously advance the polarity of a properly wound circular armature—or a Gramme ring, for other example—to cause rotation of an encircled field and parts with which it is connected at the same velocity as that of the said driven element; but, apparently, all of the apparatus heretofore devised for the purpose of carrying this conception into practical effect have involved such a large number of circuits and such an intricate, complicated, elaborate and painstaking system of wiring and connections as to be practically prohibitive both in cost of manufacture and in cost of maintenance.

The primary object of the present invention is the material simplification of such apparatus, through the reduction of the number of circuits, or shunt-circuits, required, minimizing the complexity of the wiring system, eliminating a large number of heretofore seemingly necessary parts and connections, and all without sacrifice of accuracy and general dependability.

Other objects will undoubtedly become apparent from a perusal of the following specification, in which we have described a practical and convenient embodiment of my invention, reference being had to the accompanying drawings, forming a part thereof, in which—

Fig. 4 is a partly sectional end view of Fig. 2 with the outer shell or casing removed;

Fig. 5 is a view similar to Fig. 2 of what may be termed the "distributer" or "contactor" D (Fig. 1);

Fig. 6 is a vertical cross-section, taken substantially on the line 6—6 of Fig. 5;

Fig. 7 is a vertical corss-section, taken substantially on the line 7—7 of Fig. 5;

Figure 1:
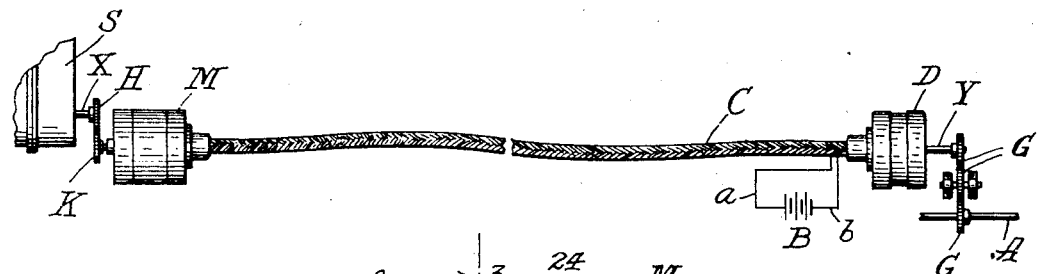
Figure 1 is a partly diagrammatic view of the assembled parts of an apparatus embodying my invention, which for the purposes of this description may be taken as showing the same interposed between the axle of a vehicle and a speedometer, and which may be considered as being a plan view, an elevation, or partly one and partly the other.
Figure 2:
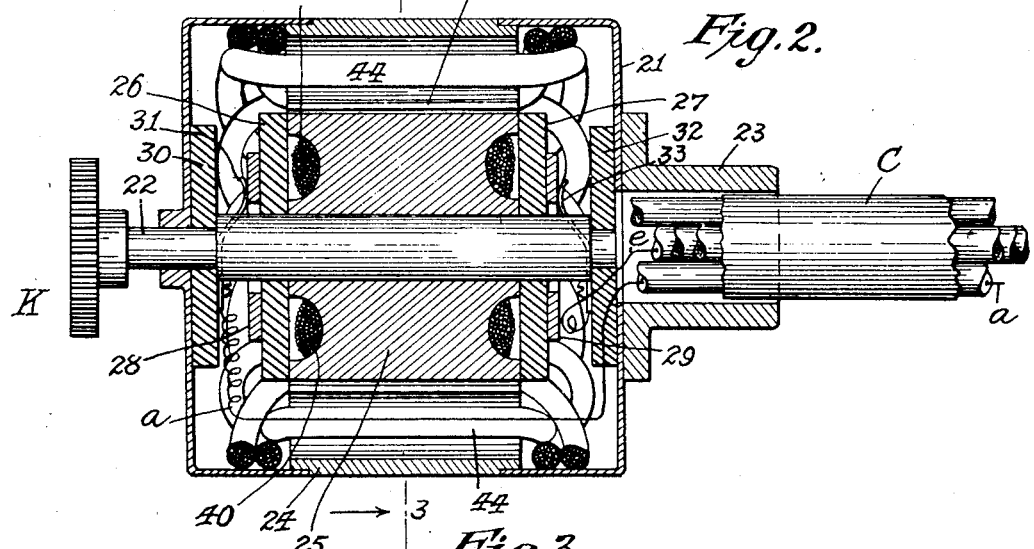
Fig. 2 is an enlarged central longitudinal section of the motor M, shown in Fig. 1.
Figure 3:
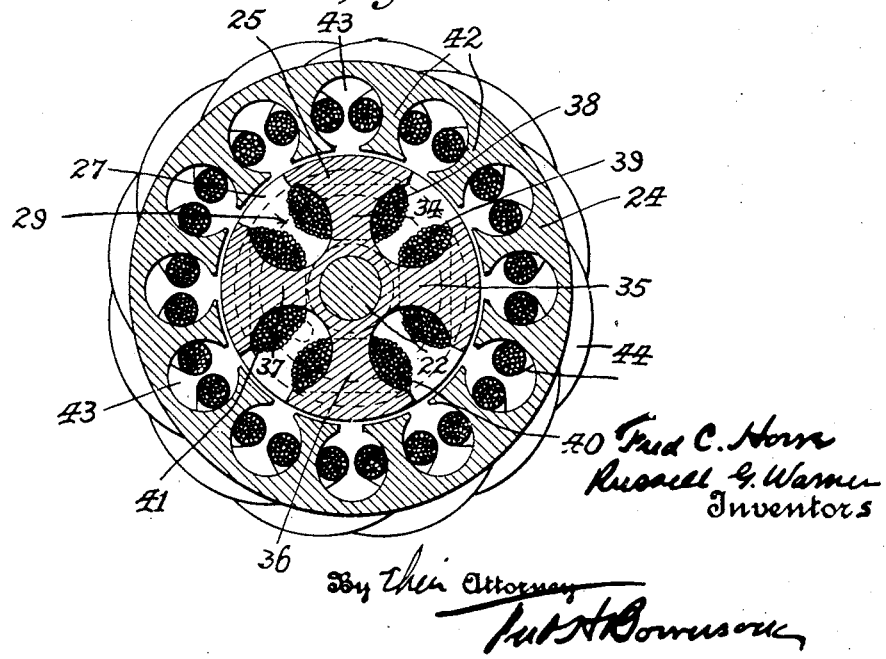
Fig. 3 is a vertical cross-section, taken substantially on the line 3—3 of Fig. 2.

In Fig. 1 of the drawings, the latter A designates what may be assumed to be the axle of a vehicle, or a shaft positively driven from such axle, and S the casing of a speedometer, the mechanism-actuating shaft X of which it is desired to drive in synchronism with the axle or shaft A. The shaft X is driven from a motor M by means of gears H and K on said shaft and the motor-shaft, respectively. What we shall hereinafter term a "distributer" D includes a shaft Y, driven from the axle or shaft A through the interposition of gears G G. The motor M is driven from a battery (or other source of electric energy) B, the wires $a$ and $b$ from which lead into a cable C and thence both directly and indirectly to the motor and to the distributer in a manner which will be hereinafter described. It is to be understood, in this connection, that we have used the terms "speedometer" and "axle" merely for purposes of brevity and convenience of illustration and description and are not to be limited to this one of the many applications of our invention. The part A may be any primary driven element and the part X any other element which it is desired to drive in synchronism therewith.

We will now refer to the distributer D, the details of construction of a preferred form of which are shown in Figs. 5, 6 and 7. This distributer comprises a preferably cylindrical stationary shell or casing 11 at one end of the interior of which is mounted the insulator-disk 12. To the inner face of this insulator-disk 12 are secured, in any suitable manner, the separated, circularly-arranged conductor disk-segments $s^1$, $s^2$, and $s^3$. The radially-disposed spaces between these disk-segments are merely sufficient to insure electrical separation and are narrow enough to insure a revolving brush, in passing from one segment to another, to contact with both at one time.

The distributer-shaft Y, rotated by, in unison with and in the same direction as the axle or shaft A (as shown in Fig. 1), has bearings in the end-plates of the shell or casing 11, and upon this shaft, within said casing, is mounted the substantially cylindrical insulator 13. To the end of this insulator 13, adjacent to the disk-segments $s^1$, $s^2$, and $s^3$, are secured the separated and radially-disposed brushes 14 and 15, in diametrical arrangement, the free ends of which are spring-pressed against the faces of two or more of said segments. As shown in Figs. 5 and 6, the brush 14 is in contact with the segment $s^1$ alone, while the brush 15 is in contact with both of the segments $s^2$ and $s^3$. As these brushes are revolved by rotation of the shaft Y, it will be seen that the brush 15 will pass from the segment $s^2$—assuming that rotation, with reference to Fig. 6, is in a clockwise direction—and contact with the segment $s^3$ alone, while the brush 14 still contacts with the segment $s^1$ alone, thus cutting out the segment $s^2$ altogether. Continued revolution carries the brush 14 to a position where it will contact with both of the segments $s^1$ and $s^2$, the brush 15 remaining in contact with the segment $s^3$ alone. Further revolution causes the brush 14 to pass from the segment $s^1$, the brushes then contacting with the segments $s^2$ and $s^3$, respectively, the segment $s^1$ being cut out. The next position is that of the brush 15 contacting with both of the segments $s^1$ and $s^3$ and the brush 14 contacting with the segment $s^2$ alone. From this position, the brush 15 clears the segment $s^3$ and passes to the segment $s^1$ alone while the brush 14 continues in contact with the segment $s^2$ alone, thus cutting out the segment $s^3$, and thence both brushes are brought back to their initial positions, as shown in Figs. 5 and 6 and diagrammatically in Fig. 8.

The insulator 13 carries the two separated conductor slip-rings 16 and 17, and interiorly mounted on the cylindrical wall of the casing 11 is the insulator-block 18 to which are secured the brushes 19 and 20 spring-pressed against the rings 16 and 17, respectively. A wire $c$ connects the brush 14 with the ring 16, and a wire $d$ connects the brush 15 with the ring 17. These wires are shown diagrammatically in Fig. 5, but it is believed that the electrical connection of such parts is too common and well-known an expedient to necessitate detailed description in this specification. The wire $b$ from the battery leads directly to the brush 20, while the wire $a$ first carries the current for the energizing of the field, as hereinafter described in detail, and then becomes wire $e$ which leads to the brush 19. Considering that the wire $a$ leads from the positive or north pole of the battery, it will be apparent that the current, after having energized the field, will be directed to the brush 19, thence to the ring 16, thence to the brush 14, and thence to the segments $s^1$, $s^2$, and $s^3$, successively, singly and in pairs, in accordance with the progressive contacting hereinbefore described.

The motor M comprises a stationary and preferably cylindrical casing 21 in which suitable bearings are provided for the motor-shaft 22 and a connection 23 for the cable C whereby the wires in the latter may be directed into the interior of the casing. Mounted within this casing 21 is an annular or cylindrical armature 24, and mounted on the shaft 22, to rotate, within this armature, is the field-magnet or rotor 25. The rotor 25 is of substantially cylindrical contour, and at the ends thereof are mounted the insulator-disks 26 and 27. To the outer faces of these disks 26 and 27 are secured the conductor slip-rings 28 and 29, respectively. Mounted upon an insulator-disk 30 at one end of the casing 21 is a brush 31, pressed to electrical contact with the ring 28, and mounted upon a corresponding insulator-disk 32 at the other end of the casing is a brush 33, pressed to electrical contact with the ring 29. The wire $a$ from the battery leads directly through the cable C and the motor casing to the brush 31, while from the brush 33 leads the wire $e$ to the brush 19 of the distributer D.

The rotor 25 is, in general, an ordinary four-pole field-magnet, which we have shown as a cylinder longitudinally grooved or channeled to provide cross 34, 35, 36 and 37 for the continuous-wire coils 38, 39, 40 and 41, respectively. One terminal of the wire of these coils is in the ring 28 and the other terminal is in the ring 29. Considering that the wire $a$ leads from the positive or north pole of the battery, the current may be said to be directed thereby to the ring 28, thence in one direction through the coil 38 around the core 34, thence in the same direction through the coil 39 around the core 35, thence in an opposite direction through the coil 40 around the core 36 and through the coil 41 around the core 37, (as illustrated diagrammatically in Fig. 8) and thence to the ring 29 and out as described. The ordinary four-pole field will thus be created, north poles being oppositely located with the south poles intermediate the same.

The armature shown comprises a cylinder longitudinally grooved or channeled interiorly to provide the cores 42 42 with winding spaces 43 43 therebetween, in the present case twelve of these cores being shown, radially and equidistantly disposed. The same number of coils 44 44 is provided, each coil surrounding three contiguous cores whereby said coils progressively overlie each other in the manner best shown in Fig. 4.

Figure 8:
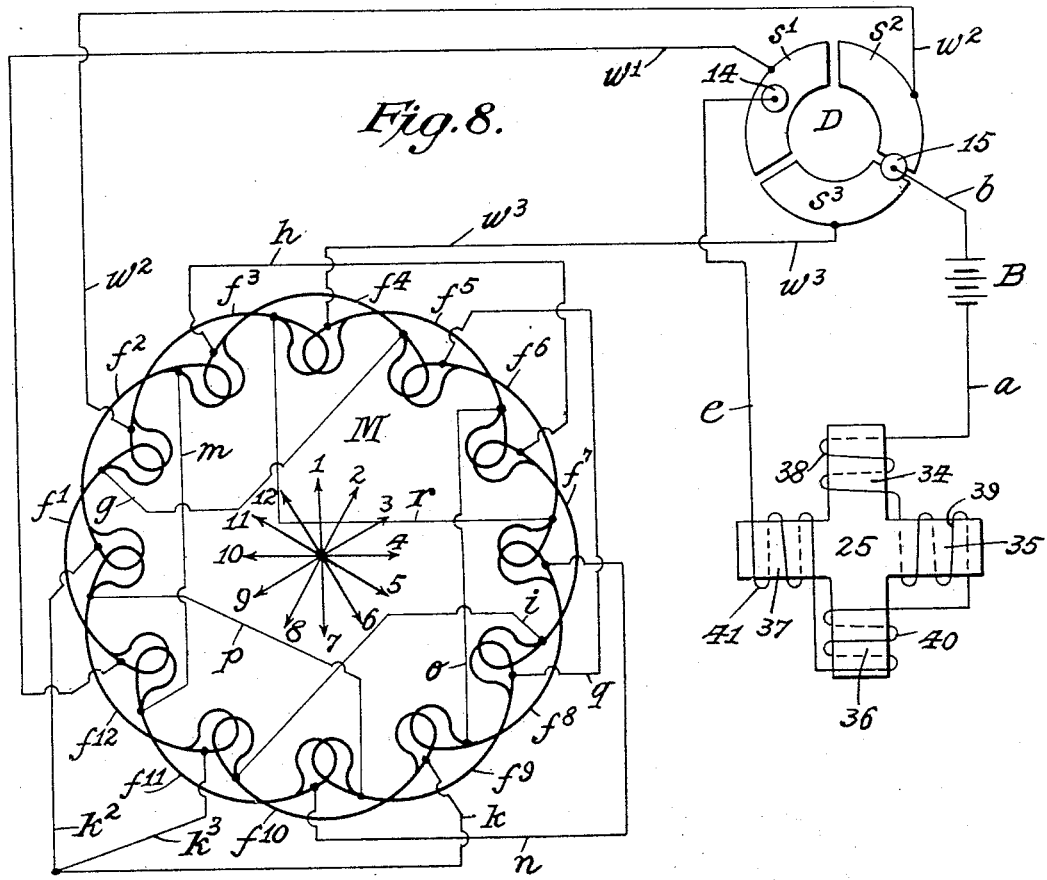
Fig. 8 is a diagrammatic view of the motor and the "distributer" or "contactor," illustrating the general scheme of the wiring system.

To avoid the confusion which might and would be likely to grow out of the use of an excessive number of lines, the armature wiring system and the connections with the distributer segments $s^1$, $s^2$, and $s^3$ are not shown in Figs. 2 to 7, but are shown diagrammatically in Fig. 8. The necessary connections may be made in any usual or conventional manner.

From Fig. 8 it will be seen that a wire $w^1$ leads from the distributer segment $s^1$ into one of the coils—we having, for the purposes of this description, selected the coil which we have designated $f^1$—through which the current flows in one direction. From the coil $f^1$ the current flows through the wire $g$ to the coil $f^4$ in which, however, the direction of winding is reversed whereby the current—under what may be termed these initial conditions, with the brushes relatively located as shown—is reversed in direction relative to the coil $f^1$. From the coil $f^4$ the current is carried through the wire $h$ to the coil $f^7$ which is wound to direct the flow therethrough in the same relative direction as the flow through coil $f^1$. The coil $f^7$ terminates in a wire $i$ which leads to the coil $f^{10}$ in which the direction of flow is again relatively reversed. From the coil $f^{10}$ leads the wire $k$ which is branched, one branch $k^2$ leading to the coil $f^2$ and the other $k^3$ leading to the coil $f^{12}$.

The wire $k^2$ directs the flow through the coil $f^2$ in the same relative direction as that of the flow through the coil $f^1$, and from the coil $f^2$ the current is carried through a wire $m$ to the coil $f^{11}$ the direction of flow in which is relatively opposite to that in the coils $f^2$ and $f^1$. From the coil $f^{11}$ leads the wire $n$ to the coil $f^8$ wherein the direction of flow is restored relative to that of the coil $f^2$. From the coil $f^8$ leads the wire $o$ to the coil $f^5$ in which the direction of winding corresponds relatively to that of coil $f^{11}$. The coil $f^5$ terminates in a wire $w^3$ which leads to segment $s^3$ of the distributer.

The wire $k^3$ leads into the coil $f^{12}$ through which the current is passed in the same relative direction as that of the flow through the coil $f^1$, and from the coil $f^{12}$ leads a wire $p$ to the coil $f^9$ in which the direction of flow is reversed, and thence leads a wire $q$ to the coil $f^6$ wherein the direction of flow is relatively restored to that through the coil $f^{12}$. From coil $f^6$ leads the wire $r$ to the coil $f^3$ wherein the direction of flow is again relatively reversed, and from the coil $f^3$ leads the wire $w^2$ to the distributer segment $s^2$.

With the distributer brushes in the relative positions indicated in Fig. 8, it will be apparent that current from the battery, after having energized the field, will flow to the brush 14, thence to the segment $s^1$, thence through the wire $w^1$ to the armature coil $f^1$, thence through the coils $f^1$, $f^4$, $f^7$ and $f^{10}$ in the manner described, whence it is divided between the coils $f^2$ and $f^{12}$, one-half flowing through the coils $f^2$, $f^{11}$, $f^8$ and $f^5$ in the manner described and from the latter to the segment $s^2$, and one-half flowing through the coils $f^{12}$, $f^9$, $f^6$ and $f^3$ in the manner described and from the latter to the segment $s^3$. The brush 15 is now contacting with both of the segments $s^2$ and $s^3$, whereby the currents in both wires $w^2$ and $w^3$ reunite in said brush and flow therefrom through the wire $b$ to the battery. Under these conditions, the field would assume the position best described (referring now to the numbered arrows) as being 1—7 10—4.

Assuming that the brushes 14 and 15 are revolving in a clock-wise direction (Fig. 8), it will be apparent that the first change of conditions will occur when the brush 15 clears the segment $s^2$. This segment is now no longer in circuit, wherefore the current from the coil $f^{10}$ through the wire $k$ will not be divided, but will flow in its entirety through the branch $k^2$ to the coil $f^2$ and thence through the coils $f^2$, $f^{11}$, $f^8$ and $f^5$, whence it is directed through the wire $w^3$ to the segment $s^3$ and thence through brush 15 and wire $b$ to the battery. Having eliminated electrically the coils $f^{12}$, $f^9$, $f^6$ and $f^3$ and doubled the intensity of the current through the coils $f^2$, $f^{11}$, $f^8$ and $f^5$, conditions with respect to the coils $f^1$, $f^4$, $f^7$ and $f^{10}$ remaining the same as before, it will be apparent that the polarity of the armature will have been advanced, pulling the field to a position intermediate 1—7 10—4 and 2—8 11—5.

These conditions continue until the brush 14 has advanced to position where it bridges the segments $s^1$ and $s^2$, the brush 15 remaining in contact with the segment $s^3$ alone. The current from the battery is now divided through the wires $w^1$ and $w^2$, one-half flowing through the coils $f^1$, $f^4$, $f^7$ and $f^{10}$ in the same direction as before and one-half flowing through the coils $f^3$, $f^6$, $f^9$ and $f^{12}$ in a reversed direction—that is to say, in a direction opposite to that first described. Obviously, these half-currents will be united through the wires $k$ and $k^3$ and a current of full intensity flow through the wire $k^2$ and through the coils $f^2$, $f^{11}$, $f^8$ and $f^5$ in the same direction as before. Clearly, polarity of the armature has now been advanced a step farther, rotating the field to 2—8 11—5.

The next step is that of the passing of the brush 14 to the segment $s^2$, clearing the segment $s^1$, the brush 15 remaining in contact with the segment $s^3$ alone. We have now cut out the segment $s^1$ and therewith the wire $w^1$ and the coils $f^1$, $f^4$, $f^7$ and $f^{10}$ and are sending full current through the coils $f^3$, $f^6$, $f^9$ and $f^{12}$. As this current cannot be divided from the wire $k^3$, it flows in full strength through the wire $k^2$ to the coil $f^2$ and through the coils $f^2$, $f^{11}$, $f^8$ and $f^5$ to the wire $w^3$, and thence through the segment $s^3$ and the brush 15 to the battery. In this manner polarization is again advanced and the field pulled to a position intermediate 2—8 11—5 and 3—9 12—6.

Proceeding, the brush 15 is brough to position where it bridges the segments $s^3$ and $s^1$ while the brush 14 remains in contact with the segment $s^2$ alone, the current being thus divided through the wires $w^3$ and $w^1$ and returning in full strength through the wire $w^2$. From the foregoing description it will be apparent that this will again advance the polarity of the armature and pull the field to position 3—9 12—6.

Similarly, continued revolution of the brushes 14 and 15 correspondingly advances polarity of the armature, and it will be seen that through the employment of three segments, two revolving brushes and three wires only to the motor we have twelve positions of positive polarization of the armature for each 360 electrical degrees, or for each half-revolution of the field, resulting from one complete revolution of the brushes 14 and 15 and therefore one rotation of the shaft Y.

Figure 10:
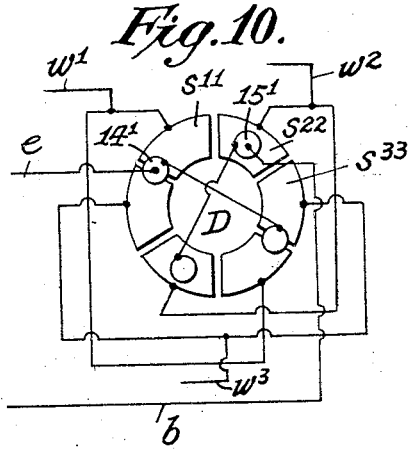

It will be noted, therefore, that in operation of the inter-related devices described the speed ratio between the shafts Y and 22 (the motor shaft) will be as 2:1. However, it would be the simplest of expedients to so proportion the gearing H K as to insure rotation of the shaft X at the same velocity as that of the shaft Y. However, should it be desired to rotate the motor shaft itself at the same velocity as that of the distributer shaft, such result may be accomplished at the expense of but slight additional labor of assembly and connecting by mounting the distributer segments in semi-circular instead of circular arrangement, each being one of a diametrically disposed pair thereof. In such case, the brushes, instead of being diametrically disposed, would be spaced apart through an arc of 90°, as shown in Fig. 10, wherein the segments $s^{11}$, $s^{22}$ and $s^{33}$ may be said to correspond with the segments $s^1$, $s^2$ and $s^3$ of Fig. 8, respectively, and the brushes 14′ and 15′ with the brushes 14 and 15 of said figure, each pair of segments being in electrical connection, as shown, and having a common wire, $w^1$, $w^2$ or $w^3$, to the proper armature coil. It will be apparent that greater capacity for the same amount of material may be obtained by making each of the brushes 14′ and 15′ one of a diametrically disposed pair thereof and connecting the brushes of each pair, as also shown in Fig. 10.

Figure 9:
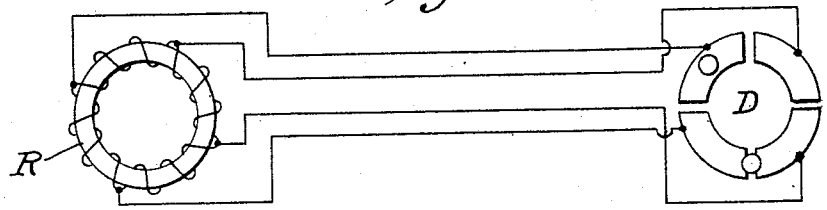
Figs. 9 and 10 are similar views illustrating modified forms of apparatus embodying the invention.

A greater number of positions of positive polarity of the armature may be obtained by increasing the number of distributer segments, but if an even number of segments is employed, such as four, as shown in Fig. 9, it will be apparent that the brushes may not be diametrically disposed but must be so spaced apart that when one brush bridges two adjacent segments the other is positioned substantially in the middle of a third segment, one segment always being out of circuit, as shown in Fig. 9. In such case, obviously, four wires to the motor are required.

We have also shown in Fig. 9 the wires from a four-segment distributer connecting with the coil of a Gramme ring R, although the three wires from a three-segment distributer might—possibly to somewhat less advantage—serve to advance the polarity of the ring at sufficiently frequent intervals to produce the desired results. However, although the principles underlying the employment of a Gramme ring in connection with our invention are undoubtedly applicable, it will be apparent that such ring will have a tendency to "side-pull" the field, at times, to a certain extent objectionable under any circumstances but particularly so when a high degree of accuracy is essential.

The armature coils would work equally as well if wound in series, instead of connecting $f^{10}$, $f^{12}$ and $f^2$ in the manner described to connect $f^{10}$ to $f^3$, $f^{12}$ to $f^5$ and $f^2$ to $f^1$. Furthermore the connections to the field may be in parallel instead of in series, or the current may be supplied to the field from a separate source of electric energy, which would be particularly desirable when the motor was necessarily located an excessive distance from the distributer.

Many other modifications of details of construction, assembly and arrangement of parts and connections of our improved electric synchronizing device will doubtless readily suggest themselves to those skilled in the art to which it appertains, and we therefore do not desire to limit our invention to the specific construction, assembly and arrangement of parts as herein shown and described.

We claim:

1. In a device of the character described, the combination, with a source of electric energy, of a motor comprising an armature having polar projections and a plurality of energizing coils connected in groups, each coil of each group overlapping adjacent coils with a polar projection in the overlap of adjacent coils, and means for energizing said groups of coils progressively with currents of maximum and less than maximum intensity, said means being further operable to progressively cut out at least one of said groups at certain fixed intervals.

2. In a device of the character described, the combination, with a source of electric energy, of a motor comprising an armature having polar projections and a plurality of energizing coils connected in groups, each coil of each group overlapping adjacent coils with a polar projection in the overlap of adjacent coils, and means for energizing said groups of coils progressively with currents of maximum and less than maximum intensity, the direction of flow of current through each alternate coil of each energized group being reversed and said means being further operable to progressively cut out at least one of said groups at certain fixed intervals.

3. In a device of the character described, the combination, with a source of electric energy, of a motor comprising an armature having polar projections and a plurality of energizing coils connected in groups, each coil of each group overlapping adjacent coils with a polar projection in the overlap of adjacent coils, and means for energizing said groups of coils progressively with currents of maximum and less than maximum intensity, said means being further operable to progressively cut out at least one of said groups at certain fixed intervals when the current through all of the remaining energized coils is of maximum intensity.

4. In a device of the character described, the combination, with a source of electric energy, of a motor comprising an armature having polar projections and a plurality of energizing coils connected in groups, each coil of each group overlapping adjacent coils with a polar projection in the overlap of adjacent coils, and means for energizing said groups of coils progressively with currents of maximum and less than maximum intensity, the direction of flow of current through each alternate coil of each energized group being reversed and said means being further operable to progressively cut out at least one of said groups at certain fixed intervals when the current through all of the remaining energized coils is of maximum intensity.

5. In a device of the character described, the combination, with a source of electric energy, of a motor comprising an armature having polar projections and a plurality of energizing coils connected in groups, each coil of each group overlapping adjacent coils with a polar projection in the overlap of adjacent coils, and means for progressively energizing first all and then less than all of said groups.

6. In a device of the character described, the combination, with a source of electric energy, of a motor comprising an armature having polar projections and a plurality of energizing coils connected in groups, each coil of each group overlapping adjacent coils with a polar projection in the overlap of adjacent coils, and means for progressively energizing first all of said groups with varying degrees of intensity of currents therethrough and then less than all of said groups with maximum degree of intensity of currents therethrough.

7. In a device of the character described, the combination, with a source of electric energy, of a motor comprising an armature having polar projections and a plurality of energizing coils connected in groups, each coil of each group overlapping adjacent coils with a polar projection in the overlap of adjacent coils, and means for progressively energizing first all of said groups with varying degrees of intensity of currents therethrough and then less than all of said groups with maximum degree of intensity of currents therethrough, the direction of flow of current through each alternate coil of each energized group being reversed.

8. In a device of the character described, the combination, with a source of electric energy, of a motor comprising an armature having polar projections and a plurality of energizing coils connected in groups, each coil of each group overlapping adjacent coils, and a current-controlling distributer comprising brushes and a series of separately insulated conductor blocks with which said brushes are adapted to contact successively, the number of conductor blocks exceeding the number of brushes, and means for establishing relative movement between said brushes and said blocks to effect such successive contacting, brushes and blocks being so relatively arranged that said brushes are always in contact with at least two of said blocks, respectively, and each brush alone bridges two of said blocks in passing from one to another.

9. In a device of the character described, the combination, with a source of electric energy, of a motor comprising an armature having polar projections and a plurality of energizing coils connected in groups, each coil of each group overlapping adjacent coils, and a current-controlling distributer comprising at least one pair of brushes and a series of at least three separately insulated conductor blocks with which said brushes are adapted to contact successively, and means for establishing relative movement between said brushes and said blocks to effect such successive contacting, brushes and blocks being so relatively arranged that said brushes are always in contact with at least two of said blocks, respectively, and each brush alone bridges two of said blocks in passing from one to another.

In testimony of the foregoing, we have hereunto set our hands in the presence of two witnesses.

FRED C. HOWE.
RUSSELL G. WARNER.

Witnesses:
F. W. W. MORROW,
GEORGE M. BEERS.